June 1, 1937. W. D. HAILES 2,082,542
AUTOMATIC TRAIN CONTROL SYSTEM
Filed Oct. 22, 1927 6 Sheets-Sheet 2

INVENTOR
W. D. Hailes
BY
Neil D. Preston
his ATTORNEY

June 1, 1937.  W. D. HAILES  2,082,542

AUTOMATIC TRAIN CONTROL SYSTEM

Filed Oct. 22, 1927  6 Sheets-Sheet 3

June 1, 1937.  W. D. HAILES  2,082,542
AUTOMATIC TRAIN CONTROL SYSTEM
Filed Oct. 22, 1927  6 Sheets-Sheet 4

| Indication Set up By Various Codes | |
|---|---|
| Cab Ind. | Name |
| G | Clear |
| Y/G | Approach Restricting |
| Y | Caution |
| R | Danger |

FIG. 12.

INVENTOR.
W. D. Hailes,
BY Neil D. Preston,
his ATTORNEY

June 1, 1937.  W. D. HAILES  2,082,542

AUTOMATIC TRAIN CONTROL SYSTEM

Filed Oct. 22, 1927   6 Sheets-Sheet 5

June 1, 1937.  W. D. HAILES  2,082,542

AUTOMATIC TRAIN CONTROL SYSTEM

Filed Oct. 22, 1927  6 Sheets-Sheet 6

INVENTOR
W. D. Hailes,
BY Neil D. Preston,
his ATTORNEY

Patented June 1, 1937

2,082,542

UNITED STATES PATENT OFFICE 2,082,542

AUTOMATIC TRAIN CONTROL SYSTEM

William D. Hailes, Rochester, N. Y., assignor to General Railway Signal Company, Rochester, N. Y.

Application October 22, 1927, Serial No. 228,059

26 Claims. (Cl. 246—63)

This invention relates in general to continuous inductive train control systems, and has more particular reference to a coded type of system employing a cyclic or periodically recurring code of a distinctive pattern as distinguished from a frequency, non-cyclic, code or the like, in which the differentiation between codes resides in the difference in rates of interruption of the control current, instead of the difference in patterns.

In the system to which the present invention relates, trackway apparatus is employed which comprises means controlled in accordance with traffic conditions and track hazards for continuously putting distinctively coded current on the track rails, while the car-carried apparatus comprises receiving means which are inductively related to the coded rail currents. The receiving means is connected up, preferably, to a filter circuit and amplifying means, to feed a main relay which picks up and releases in accordance with the presence or absence or the coded trackway current. Included in the car-carried apparatus is decoding means which sets up certain executing circuits in accordance with the particular code received from the track rails, to thus energize slow-acting repeating means, which in turn energize secondary circuits which function to control cab signals, to enforce acknowledgment under certain conditions, to give audible as well as visible notice when acknowledgment is required, to initiate an automatic brake application in case of failure to acknowledge, to provide means with which to restore control to the engineman after an automatic brake application, and to otherwise control the train as may be required, or desirable.

In such systems as above referred to, it is generally desirable to reduce, as far as possible, the number of moving or vibrating parts, such as relay fingers, and hence one form of the system has been so arranged that when the train is proceeding under clear conditions, which conditions it is assumed will prevail a greater part of the time than will any one, or all, of the other conditions, the decoding means is not successively set up, then cleared out, again set up, etc., in accordance with the particular code being received, but once set up it will so remain until a change in code occurs, whereby only the coding primary relay will be required to repeatedly move in response to the repeated code for clear conditions. For the other and more restrictive indications, the decoding device will periodically set up certain circuits, then be cleared out, then again set up certain circuits, etc. in accordance with the particular code being received.

In a second form of the invention, the decoding device is periodically cleared out for clear conditions as well as for the others, but one advantage over the first form is that the clear code here employed is less likely to be accidentally produced to thus give a false clear indication.

Also by the use of a modification of this second form of code, no clear out occurs for clear conditions, and yet the pattern form of code is retained to make very unlikely, the accidental occurrence of the code.

In the present system, a danger condition is indicated by the absence of train control current in the track rails and hence in the absence of some provision to the contrary the failure of such current at so called "dead sections", which may occur at switch points, turn-outs and the like, would cause a momentary danger indication. In order to avoid this undesirable feature, means have been provided whereby, after the decoding device has once set up a particular condition, this condition will prevail in, and be retained by, the car-carried apparatus, for a short period of time regardless of momentary changes in trackway conditions, whereby the very objectionable feature of flashing of the red lamp at dead sections and the like, is completely eliminated. Likewise for all other indications the non-flashing means is arranged to require that all changes in trackway condition must persist for a specified time of a few seconds before the previous car-carried indication changes.

In providing the above means for avoiding momentary flashing of indications, as for example, the flashing of the red lamp at dead sections, by means of retaining a particular set-up for some time after the trackway conditions causing that particular set-up have changed, there arises the necessity for providing against two signals appearing simultaneously, since the code changing during this retention period would tend to set up two separate signal and control circuits corresponding to two separate traffic conditions. By arranging the various instrumentalities, however, in a particular cross-connected manner, as explained in detail below, all possibility of two signals being simultaneously energized, has been obviated.

Very briefly stated, the system, in accordance with this invention, provides car-carried apparatus which displays distinctive cab signals corresponding to traffic conditions, which requires acknowledgment upon every change to more restrictive conditions with a penalty of a brake application or the like upon failure so to acknowledge, which sounds an audible signal to advise the engineer when acknowledgment is required, which gives a red or danger signal whether the train control current is steady off or steady on, which requires no acknowledgment on a change to less restrictive conditions, and finally, which avoids simultaneous showing of two or more cab signals while at the same time provides against momentary flashing of any indications with momentary changes in trackway conditions as with possible interference by propulsion currents or the like which might cause momentary pick-up of the coding primary relay or the momentary obliteration of the existing coded control current.

The present invention therefore comprises among its purposes the above set forth features.

Further objects, purposes and characteristic features will appear as the description progresses, reference being had to the accompanying drawings, showing, solely by way of example, and in a wholly diagrammatic manner, several forms which the invention can assume. In the drawings:—

Fig. 2A shows a slightly modified form of Fig. 2;

*Trackway apparatus*

Figure 1:
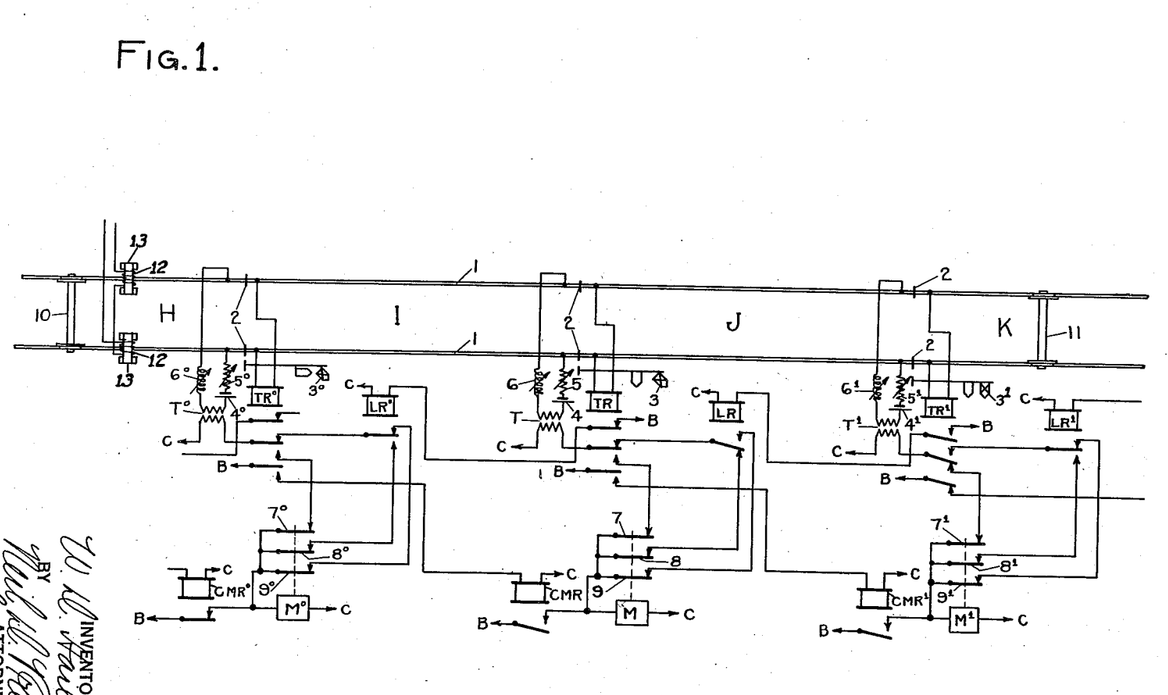
Fig. 1 shows trackway apparatus in accordance with this invention.

Referring to Fig. 1 of the drawings, there are shown track rails 1, forming a stretch of single track divided into blocks H, I, J, and K, by insulating joints 2, and provided with a wayside signal 3 at the entrance to each block. It is to be understood that the present system is wholly sufficient in itself, and can be used if desired without any wayside signals whatsoever, such wayside signals 3 being shown primarily to aid in a ready understanding of the trackway conditions represented, it being deemed unnecessary to show the usual control circuits and devices for operating such wayside signals.

The various devices and circuits used in connection with each signal location are identical for the different locations, and corresponding parts are accordingly identified below by the same reference characters with distinctive exponents.

At every signal location is a track battery 4, connected across the track rails at the exit end of the block in series with the secondary of a transformer T, and current limiting variable resistances and inductances 5 and 6 respectively. The transformer T has its primary supplied with electrical energy, preferably alternating in character, and having a distinctive frequency different from usual commercial frequencies, as, for example, 100 cycles per second. Connected across the entrance end of each signaling block is a track relay TR, which controls a series of contact fingers in the usual manner, a line relay LR, a coding motor relay CMR, and a coding motor M, represented as having coding fingers 7, 8, and 9 for, respectively, applying three distinctive codes to the track rails.

The trackway apparatus employed in the present case is substantially the same as that described in detail in applicant's co-pending application, filed of even date herewith, for "Continuous train control system", Ser. No. 228,058, now Patent No. 1,852,409, granted April 5, 1932 and reissued as Serial No. 638,634, now Reissue Patent No. 19,599, granted June 4, 1935, and hence it appears unnecessary to go to any great length in the present case in describing this apparatus.

The coding motor M, for each signal location, is normally de-energized, and is only energized when the relay CMR, for the block to which code is to be applied, is itself energized. Each line relay LR is, as usual, controlled by the track relay of the block in advance. The fingers 7, 8 and 9 of the coding motor M are arranged to make and break contact in a predetermined manner in accordance with the particular code to be sent out by each finger, and while respresented as vibrating members, they could, of course, comprise rotating drums having suitable contact making means thereon to cooperate with other fixed contacts.

As shown in Fig. 1, the blocks H and K are, respectively, occupied by cars represented by wheels and axle 10 and 11, whereby block K is a danger block, block J a caution block, block I an approach restricting block, and block H a clear block, insofar as the car 10 is concerned. It is to be observed from Fig. 1 that the coding motors for the blocks I and J are deenergized under the condition shown, while that for the block H is energized to apply the code controlled by finger 9, which is the G, or clear, code. Upon entrance of a train into block I, the coding motor M will be energized due to the release of the track relay for block I, to thereby apply the Y/G, or approach restricting code to the rails of block I through control finger 8, and likewise with regard to block J, the control finger 7, under similar conditions, will apply the Y or caution code.

With regard to block K which is a danger block, a train entering this block would normally receive no current at all from the track rails as the rail current would be shunted by the wheels and axle 11 of the advance train. Should a coding motor M become inoperative at a time when it should be operated, it might stop either with its active coding finger in either its open or closed position to thereby respectively give no train control track current at all or else a steady-on track current of uncoded character.

Thus it is seen from the above that a distinctive coded train control track current is placed on the track rails in accordance with traffic conditions ahead and that, upon a breakdown of the coding device, a track rail current of steady-on or steady-off will result, which will operate to give a danger signal on the train, as will presently appear, so that the system is of the closed circuit type in the very highest sense of the word.

*Car-carried apparatus*

Figure 2:
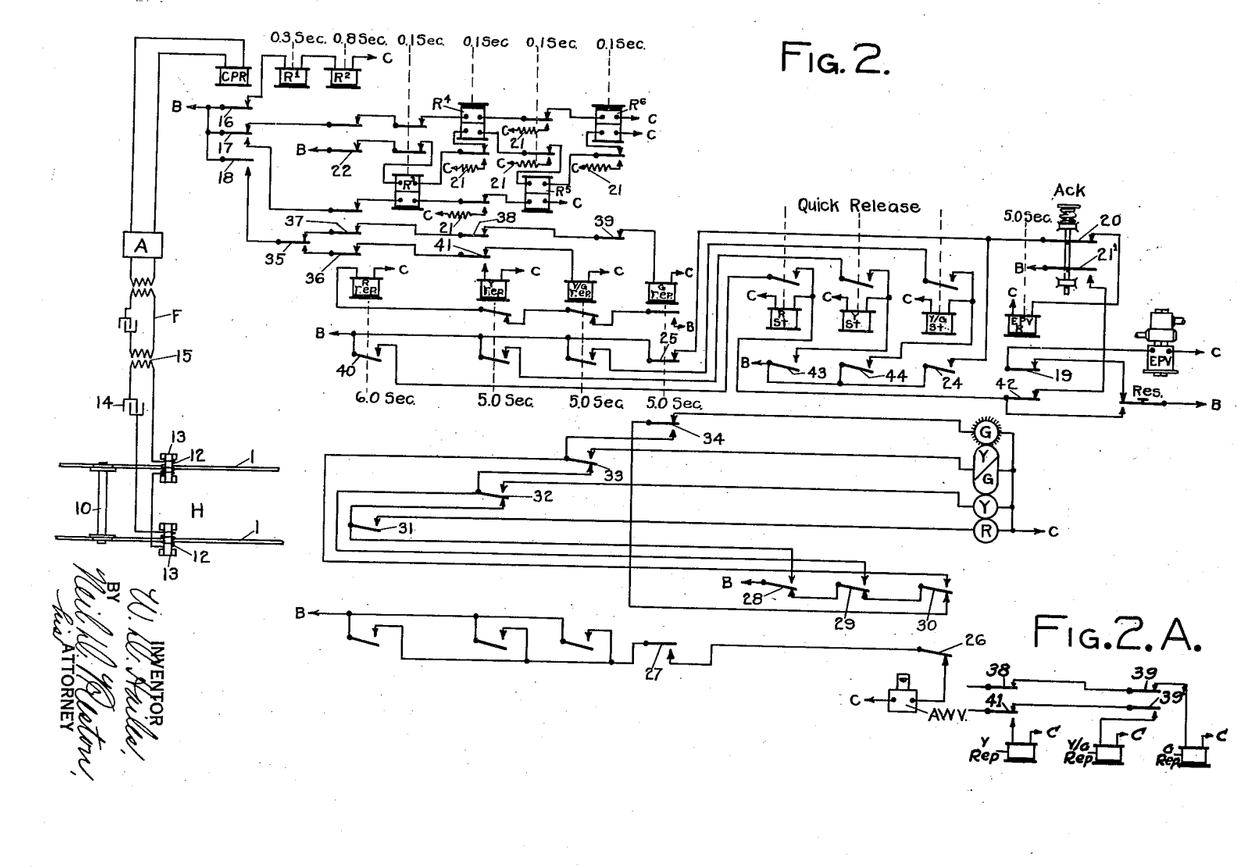
Fig. 2 shows car-carried apparatus in accordance with this invention.

Referring now to Fig. 2 of the drawings, a section of the track rails 1, in the block H of Fig. 1, is shown as occupied, in the same manner as in Fig. 1, by a car represented by the wheels and axle 10. Carried on the car in advance of the front axle, are receiving coils 12, positioned above the track rails in inductive relation thereto, so that the track rails act as the primaries of transformers, of which the secondaries are the coils 12. These coils may or may not be wound on cores 13, which may or may not be laminated, as desired, and the coils are so connected that the voltages induced therein are cumulative, the two coils being connected in series with each other and with a tuning condenser 14 and the primary of a transformer 15. The secondary of the transformer 15 is connected in a filter circuit F which is arranged to filter out all frequencies other than that of the train control current, which, as stated above, is preferably of a distinctive frequency such as 100 cycles per second. The output side of the filter circuit F is connected to the input side of an amplifier A, which may be of any desired type, but is preferably of the vacuum tube type, and employs usual sources of energy and the like. The output side of the amplifier A is connected to a coding primary relay CPR, which is designed to be quick to pick up and to release, so that its contact fingers 16, 17 and 18 are attracted when control current is present in the track rails, and are retracted when such current is absent from the track rails.

Employed in connection with the coding primary relay CPR, are six decoding relays, $R^1$, $R^2$, $R^3$, $R^4$, $R^5$, and $R^6$, all relatively quick to pick up, but designed to have slow drop-away characteristics, as indicated in the drawing, that is, respectively .3 secs., .8 secs., .1 secs., .1 secs., .1 secs., and .1 secs. These relays $R^1$–$R^6$ are arranged to pick up in consecutive order from low to high exponents in accordance with the operation of the coding primary relay, and to then release in a predetermined order and at given time intervals to thereby first complete circuits for applying energy to one of the four repeater relays R rep., Y rep., Y/G rep., and G rep., and second, to clear out the former set-up and restore the relays $R^1$–$R^6$ to their original condition ready to respond to a new set of code impulses.

The repeater relays, as indicated on the drawings, are very slow to release, the red repeater having a time constant of 6 seconds, and each of the others 5 secs., whereby, after once having been energized to pick up and complete certain circuits, these circuits are retained intact for a period equal to the release time of the repeater relay in question, whereby to store up the received indication for a time.

Employed in this system are the following:—
A device EPV, which may be of any desired character, but is contemplated here as being an electro-pneumatic device arranged, when energized, to prevent an automatic brake application or other restrictive influence on train movement, and to initiate such influence upon its de-energization, a relay EPVR arranged, when energized, to normally maintain energy on the device EPV, through a contact finger 19 and front contact thereof, an acknowledging contactor Ack, designed to operate contact fingers 20 and $21^1$ to thereby prevent an automatic brake application under certain conditions. A reset contactor Res, for restoring the various parts to normal after incurrence of an automatic brake application, an acknowledging whistle AWV, which gives an audible indication when acknowledgment is necessary, a cab signal G, Y/G, Y, and R, so positioned in the cab as to be readily seen by the engineer, and, if desired, a second such signal can be so positioned as to be readily viewed by the fireman, as in the companion application referred to above.

Figure 3:
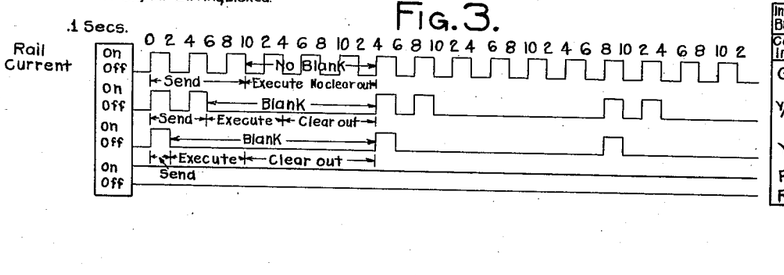
Fig. 3 shows one set of codes chosen to conform with the particular timing of apparatus shown in Fig. 2.

The various instrumentalities described above are connected up in circuits for accomplishing the desired results, but before analyzing these circuits, and discussing them in some detail, it would seem best to consider the showing in Fig. 3 of the various codes which can be employed in connection with the car-carried apparatus described above and shown in Fig. 2. The particular codes shown in Fig. 3 have been chosen to conform with the particular time constants shown in Fig. 2 in connection with the various relays employed. Various other codes could be used, which might require a change in the timing of the various relays employed, and also various other timed relays could be employed, which might require a change in the codes employed.

*Codes employed*

As shown in Fig. 3, each of the codes comprises a sending time, followed by a blank, and during the sending time, the wayside coding motor M applies train control current to, and then removes such current from, the track rails, one or more times, in accordance with traffic conditions, hazards, etc., while during the blank the wayside coder M prevents current from being applied to the track rails. The code for caution Y, is, send one and then a blank, that for approach restricting, Y/G, is, send two and then a blank, while that for clear, G, is send three and then, instead of a blank, the sending is continued as long as this clear code is in force. However, as will appear from the discussion to follow, this code might be of the same character as the codes for caution and approach restricting, that is, it might be send three and then a blank, and the car-carried apparatus, slightly modified as shown in Fig. 2A, will operate satisfactorily with such a code. For indicating danger, the current in the rails is either steady on or steady off and, of course, will normally be steady off, due to the shunting effect on the rail current by the wheels and axle of the advance train in the danger block.

*Operation*

Considering first the relay CPR and the decoding relays $R^1$–$R^6$, it will be clear that with any particular code applied to the track rails, the contact fingers of relay CPR will move in accordance with the code, being up when current is on, and down when current is off. The relays $R^1$ and $R^2$ are energized when relay CPR is up, through a circuit including contact finger 16 of relay CPR. Relay $R^3$ is picked up when relay CPR is down providing relay $R^2$ is already up, through a circuit including finger 17 and back contact of relay CPR, a front point of relay $R^2$, and a back point of relay R⁴, and after once being picked up, relay R³ is stuck up through a circuit including front points of relays R² and R³, and a back point of relay R⁴. Relay R⁴, is picked up with relay CPR in attracted position, providing relays R² and R³ are already up, through a circuit including contact finger 17 and front contact of relay CPR, front points of relays R² and R³, and a back point of relay R⁵, and, as is the case with relay R³, when once picked up, it is stuck up through a circuit including a part of the stick up circuit for relay R³ and also including a front point of relay R⁴, and a back point of relay R⁵. In like manner, relay R⁵ is picked up when relay CPR is down, providing relays R² and R⁴ are already up, through a circuit including contact finger 17 and back contact of relay CPR, a front point of R², the pick-up winding of R³, and a front point of R⁴, and when picked up, is stuck up through front points of R² and R³, the stick winding of R³, a front point of R⁴, the stick winding of R⁴, a front point of R⁵, the stick winding of R⁵, and a back point of R⁶. Likewise relay R⁶ is picked up, on attraction of relay CPR, providing R², R³ and R⁵ are already picked up, through a circuit including front contact of relay CPR and contact finger 17, front points of relay R² and R³, pick-up winding of R⁴, and a front point of R⁵, and is stuck up in a manner as described for the other relays, through a circuit including part of the stick circuit for R⁵, and a front point of R⁶, i. e., through front points of R² and R³, stick winding of R³, a front point of R⁴ and the stick winding thereof, a front point of R⁵ and the stick winding thereof, and a front point of R⁶ and the stick winding thereof.

It will be seen from the above, that as the coding primary relay CPR, alternately picks up and releases, one or more times in accordance with the particular code being received, the relays R¹ to R⁶ will be successively picked up in sequence beginning with R¹ and R² which pick up on the first pick up of CPR, then one of the remaining relays will pick up for each subsequent movement of the CPR relay, and after being picked up, relays R³ to R⁶ will be stuck up, due to a stick-up circuit which is primarily controlled by contact finger 22 and front contact of relay R², and which includes, in addition to such contact finger 22, a contact finger and front contact of each of the relays R³-R⁶. The various resistances 21, inserted in the circuits discussed above, are so arranged as to keep the current flowing through the different relays practically constant regardless of whether the circuit in question includes in series one or more relays.

Considering the various set-ups produced by the decoding relays R¹-R⁶, under the different codes shown in Fig. 3, it will be seen that, with the G or clear code, all of the relays R¹-R⁶ will be up; with the Y/G code, R¹-R⁵ will be up and R⁶ down; with the Y code, relays R¹, R², and R³ will be up, and R⁴, R⁵, and R⁶ down, and with the danger conditions, i. e., no regular code, corresponding normally to no control current in the track rails under the coils 12, all of the relays R¹-R⁶ will be down.

Regarding the various repeater relays R rep. etc., only one of these relays has its energizing circuit completed at any one time in accordance with the particular set-up of the decoding relays R¹-R³, described above, while the other three are de-energized.

Various stick relays, R st., Y st., and Y/G st., are each arranged with a pick-up circuit and a stick-up circuit; the pick-up circuit for each relay being controlled by a front point of the stick relay corresponding to the next more restrictive traffic condition, while the stick-up circuit for each of these relays passes through a front point of the corresponding repeater relay. Thus, the particular stick relay which corresponds to the repeater relay which is energized, due to a particular set-up of the decoding relays R¹-R⁶, is stuck up, if once picked up, and thus maintains all those stick relays corresponding to less restrictive conditions energized in picked up condition, through their pick-up circuits, and all the necessary control circuits will later be described in detail.

Regarding the device EPV, this, as described above, upon de-energization, initiates a train restrictive effect, but is normally energized. The energization of EPV in turn depends upon energization of relay EPV.R, which latter relay can be energized through either one of two circuits, one of which includes acknowledging finger 20 and its front contact, and contact finger 24 and front contact of the stick relay Y/G st., and the other of which includes contact finger 20 and front contact of Ack, and finger 25 and front contact of relay G rep.

The reset device Res., is suitably protected against misuse, preferably by being positioned so as to be inaccessible when the train is in motion, such for example as positioning it to be operable only from the ground. Operation of the reset contactor closes a pick-up circuit for relay R st., as is obvious from the Fig. 2 of drawings, and this results in all of the stick relays being picked up, in turn, to thereby complete the energizing circuit for relay EPV.R, which circuit includes contact finger 24 and front contact of relay Y/G, Stk, and Ack finger 20 and its front contact, as traced just above.

In addition to the change in cab signals the engineer is warned by an audible signal when acknowledgment is necessary. This device is indicated by AWV, and sounds a signal, such as a whistle, upon being energized. The energizing circuit for this device AWV includes contact finger 26 and back contact of relay Y/G st., contact finger 27 and back control of relay G repeater, and a front contact and contact finger of any one of the other repeater relays.

The cab signals are energized through circuits including back and front contacts and contact fingers 28, 29, and 30 of the three stick relays R, Y and Y/G st., and various of the contact fingers 31, 32, 33, and 34 of the repeater relays R, Y, Y/G and G rep., respectively, as appears more fully below.

Figure 4:
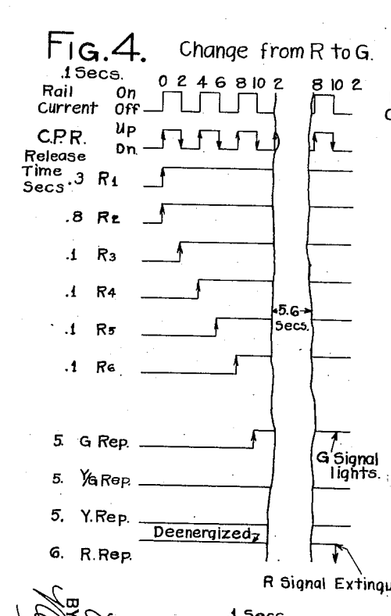
Fig. 4 is a time study of the operation of the apparatus shown in Fig. 2 upon a change in trackway conditions from danger to clear.
Figure 5:
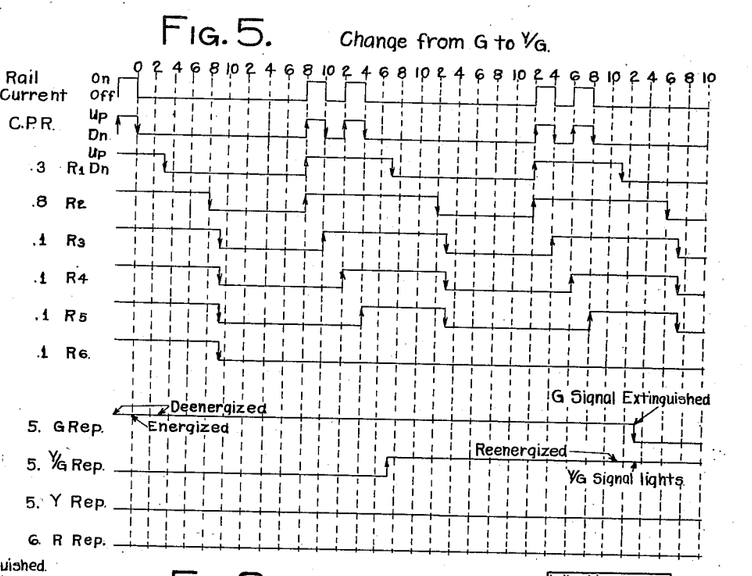
Fig. 5 is a time study, similar to Fig. 4, upon a change in conditions from clear to approach caution.

There are shown, in Figs. 4 and 5, in a diagrammatic form, time studies of the operations of various of the relays included in the car-carried apparatus, the particular time studies chosen for the purpose of illustration, including the operation of the system upon a change from danger to clear, that is from R to G, and a change from clear to approach restricting, that is from G to Y/G.

For the purpose of explanation, let it be assumed that a change takes place in traffic conditions from danger to clear. Under danger conditions such as exist in block K of Fig. 1, it will be remembered that there is normally no train control current in the rails, since this is shunted away from the train in question by the wheels and axles of the train in advance thereof. Thus relay CPR on the train is de-energized and remains de-energized with the result that all of the relays R¹–R⁶ are deenergized and so remain, and with R¹–R⁶ down, the repeater relays Y, Y/G and G are down. In these circumstances the red or danger repeater relay R rep. is energized through a circuit including a contact finger and back point of each of the other repeater relays. Assuming that the acknowledging act was performed upon encountering danger conditions, or in lieu thereof that a resetting operation was subsequently performed, thus to pick up R stk., with R rep. picked up, R stk. is stuck up, and the red signal R, is energized through a circuit including contact finger 31 and front contact of R rep. and contact finger 28 and front contact of R stk.

Upon a change from danger to clear, relay CPR is energized in accordance with the clear code, G, as shown in Fig. 3, with the result that it picks up and drops away alternately, as indicated in Fig. 4, faithfully following the on and off periods of the rail control current. As indicated in Fig. 4, on pick-up of relay CPR for the first time, relays R¹ and R² pick up; on release of relay CPR for the first time relay R³ picks up; on pick-up of relay CPR for the second time, relay R⁴ picks up; on release of relay CPR for the second time, relay R⁵ picks up; on pick-up of relay CPR for the third time relay R⁶ picks up; and on release of relay CPR for the third time the green repeater relay, G rep. is energized and picked up through a circuit including contact finger 18 and back contact of relay CPR, and contact fingers 35, 37, 38, and 39 and front contacts of relays R¹, R², R⁴, and R⁶, respectively. The coding primary relay continues to vibrate at a faster rate, .2 secs., than the release time of relay R¹, so that on every release of the coding relay CPR, the green repeater relay G rep. which has a release time, as indicated in Fig. 2, of 5.0 seconds, is reenergized and hence holds the clear indication. Six seconds after the pick-up of relay G rep. which caused de-energization of relay R rep., this red repeater relay releases its contact finger 40 to thereby break the stick circuit for the red stick relay R stk. and thus de-energize, in succession, the yellow stick Y stk., and the yellow green stick Y/G stk., relays. The relay EPV.R, however, is not de-energized by the drop away of contact finger 24 of relay Y/g stk. since the relay G rep. has already picked up its contact finger 25. It is only after the release of R rep. that energy is taken off of the red signal R, by the way of contact finger 31 of the red repeater relay, and only after the de-energization of all the stick relays, that energy is put on the clear signal G, through a circuit including contact finger 34 and front contact of the green repeater relay, and contact fingers 28, 29 and 30 and back contacts of the three stick relays R, Y and Y/G respectively.

From the above it will be clear that the cab signal can change from red to green only after the red signal has been de-energized so that it is quite impossible to have two signal indications at the same time. Furthermore, for a change in traffic conditions to cause a change in signal indication, it is necessary that the traffic change persist for the duration of the drop away period of the repeater relays, namely several seconds, so that the arrangement provides against flashing of the signals due to dead sections and the like, and at the same time prevents simultaneous showing of two or more signals, even though two or more of the repeater relays are in picked up position at one time. Also, in changing to a less restrictive condition, there is no necessity for acknowledging, since for a given restrictive indication the stick relays for all less restrictive indications and also the EPV.R are maintained in picked up position, and when the trackway conditions change to a less restrictive condition the control circuits for the new indication are found already established, and, of course, with no acknowledging act necessary no acknowledging whistle is desired and none occurs.

Let it now be considered what occurs when a change to more restrictive traffic conditions takes place, such, for example, as the change diagrammatically illustrated in the time study of Fig. 5, from clear or green, to approach restricting or yellow green.

It is to be remembered that under clear conditions, the various parts are as shown in Fig. 2. Upon experiencing the blank of the yellow green code, as illustrated in Fig. 3, relay CPR releases and stays down until the first sending period of the next set of impulses of this code. Three-tenths of a second after the release of relay CPR, relay R¹ releases, to thereby de-energize the green repeater relay G rep. which, however, does not at once release but remains attracted for a period of 5 seconds. Eight-tenths of a second after release of relay CPR, relay R² releases, to thereby break their stick circuit and de-energize relays R³–R⁶, all four of which relays in turn release .1 of a second thereafter, to thereby clear out the decoding relay group. Upon receiving the first sending impulse of the yellow green code, and the consequent pick-up of relay CPR, relays R¹ and R² pick up; on the first release of relay CPR, relay R³ picks up; on the second pick-up of relay CPR, R⁴ picks up; and on the second release of relay CPR, relay R⁵ picks up (but in this particular case the pick-up of relay R⁵ serves no useful function).

After the above chain of events, the coding primary relay CPR remains down during the blank period of the code, whereupon, .3 of a second later relay R¹ releases, and the same cycle of events takes place with regard to release of R²–R⁶, as just described.

As indicated in Fig. 5, upon the release of relay R¹, an energizing circuit is completed for the yellow green repeater relay Y/G rep., which includes contact finger 18 and back contact of CPR, contact finger 35 and back contact of relay R¹, and contact fingers 36 and 41 and front contacts of relays R² and R⁴, respectively. The energization of relay Y/G rep. does not immediately serve any useful function with regard to signal Y/G, since the energizing circuit for signal Y/G cannot be completed until after release of the green repeater relay G rep.

The same cycle of operation of the decoding means repeats until 5 seconds after the first release of relay R¹, causing de-energization of G rep., at which time relay G rep. releases its contact fingers 25, 34, and 27.

The drop-away of contact finger 25 de-energizes relay EPV.R, while the drop-away of contact finger 27 completes an energizing circuit for the acknowledging whistle valve AWV which includes contact finger 26 and back contact of relay Y/G stk., and contact finger 27 and back contact of relay G rep., to thereby sound the acknowledging whistle to advise the engineer that the acknowledging act should be performed. Due to its slow release time of five seconds, relay EPV.R does not at once release its contact finger 19 to de-energize EPV, and in order to prevent the de-energization of EPV, the acknowledging contractor Ack must be depressed within this period of time, and is preferably held depressed until a silencing of the acknowledging whistle indicates that it can be released.

Let it be assumed that the engineer is alert and depressed the acknowledging contactor Ack upon hearing the acknowledging whistle. This puts energy on the pick-up circuit for the red stick relay R stk., which includes contact finger 21¹ and back contact of Ack, and contact finger 42 and front contact of EPV.R. On picking up of the red stick relay R stk. the pick-up circuit is completed for the yellow stick relay Y stk., which includes contact finger 43 and front contact of the red stick relay, and likewise picking up of the yellow stick relay completes a pick-up circuit for the yellow green stick relay which includes contact finger 44 and front contact of the yellow stick relay. Now, since the yellow green repeater relay Y/G rep. is up, the stick circuit for the yellow green stick relay is completed and operates to stick up relay Y/G stk. The attraction of contact finger 26 of relay Y/G stk. de-energizes the device AWV to thus silence the acknowledging whistle and advise the engineer that the acknowledging contactor Ack can be released.

Retracing our steps to the time when relay G rep. released its contact finger 34, a momentary energizing circuit for signal Y/G was completed which includes one terminal C of a source of energy, signal Y/G, contact finger 33 and front contact of relay Y/G rep., contact finger 34 and back contact of relay G rep., and the contact fingers 30, 29, and 28 and back contacts of the three stick relays, to the other terminal B of said source of energy. This energizing circuit for the signal Y/G remains intact until the red stick relay R stk. is picked up upon acknowledgment, as described above, whereupon this energizing circuit is broken at the contact finger 28 and back contact of the relay R stk. But energy is taken off of signal Y/G only momentarily for upon the immediate subsequent energization of relay Y/G stick, to pick up its contact finger 30, a second, and permanent, energizing circuit for signal Y/G is completed which includes contact finger 33 and front contact of the yellow green repeater relay Y/G rep., contact finger 30 and front contact of the yellow green stick relay Y/G stk., and contact fingers 29 and 28 and back contacts of the yellow and red stick relays respectively.

Thus it will be seen that upon a change of trackway conditions to a more restrictive indication, the system operates to sound an acknowledging whistle to advise that acknowledgment is necessary, and only changes the cab indication to a more restrictive indication after the former indication has been wiped out. That is, the signal Y/G is not energized until after signal G is de-energized so that two different signal indications cannot simultaneously exist. At the same time, the more restrictive indication is not given until after the lapse of several seconds from the time of the change in traffic conditions, that is, the more restrictive signal is not shown until after the release of the repeater relay corresponding to the former, less restrictive, signal indication, whereby momentary changes in trackway conditions, such as occur at dead sections and the like, can not cause a change in signal indication.

As described above, short periods of no train control current in the rails, during travel in other than danger territory, cannot cause a false danger indication. It should be noted, further, that relay R rep. has a drop-away time, of 6 seconds, i. e. 1 second greater than that of the other repeater relays. Thus, if while traveling in danger territory, a single impulse, or two properly spaced impulses of current should accidentally occur, one of the relays Y rep. or Y/G rep. might pick up, to thus de-energize the R rep. relay, but before R rep. could drop, and change the indication, the other repeater relay could stay up its 5 seconds, and then drop, to thus re-energize R rep. and leave the danger indication undisturbed.

In the above discussion with regard to a change from clear to approach restricting, it was assumed that the engineer operated the acknowledging contactor upon noting a change in indication and hearing the acknowledging whistle. If, however, the acknowledging act is not performed within the five-second drop-away period of relay EPV.R, the energizing circuit for the device EPV is broken at contact finger 19 and front contact of relay EPV.R, to thereby incur, for example, an automatic brake application. The acknowledging contactor cannot be availed of after dropping away of relay EPV.R, since the energizing circuit for the red stick relay R stk. includes a front point and contact finger 42 of relay EPV.R, and thus the acknowledging act must be performed within a specified time, to be effective.

After having incurred an automatic brake application, the train can be released from the brakes only by energizing the device EPV, which can be accomplished only by depressing the reset contactor Res., and since this is accessible only from the ground, it is necessary to bring the train to a full stop in order to reset. Upon depression of the reset contactor Res., the pick-up circuit for relay R stk. is energized, and the same cycle of events takes place as if this pick-up circuit for relay R stk. had been energized by means of the acknowledging contactor Ack. and its contact finger 21¹ and front contact.

While the train control device EPV has not been shown in connection with any speed control means, it is obvious that any desired or suitable speed control means could be incorporated therewith, whereby the reset function might be automatically performed, or manually performed by use of the acknowledging contactor, upon reducing the train speed to a low minimum speed as, for example, two miles per hour, and whereby an automatic brake application might be initiated whenever the train speed exceeded a tapered speed limit set up by speed distance contacts, for example, as shown and described in the patents to Simmen Nos. 1,150,308 and 1,150,309 of August 17, 1915.

From the above detailed discussion of a change from red to green, that is, to a less restrictive condition, and a change from green to yellow green, that is, to a more restrictive condition; it will be clear that in each case, two signals cannot be simultaneously energized, and that temporary changes in trackway conditions, such as would be occasioned by dead sections and momentary interference current impulses, and the like, cannot cause a change in signal aspect. Further it will be clear that for every change to a more restrictive condition, a timely acknowledging act must be performed in order to avoid a penalty in the form of a brake application, or the like; while upon every change to less restrictive conditions, no such acknowledging act is necessary.

In connection with the decoding relays R¹–R⁶, it will be seen that energy is applied to all the various repeater relays, except R rep. through contact finger 35 and its front or back contact on relay $R^1$, so that this relay can be considered the executing relay, whereas relay $R^2$ can be considered the clear-out relay, since it is upon the dropping away of its contact finger 22, that the remaining relays $R^3$–$R^6$ have their stick circuits de-energized, to thereby clear out the decoding device, and prepare it for the next set of code impulses of whatever character such next code may be.

While the green code, as shown in Fig. 3, comprises a series of sending periods uninterrupted by any extended blank, such as occurs with the other codes, it will be clear, upon considering the decoding device of Fig. 2, that a modified green code, comprising a sending period of send three and then a blank, would equally well operate the slightly modified form of apparatus shown in Fig. 2A, so that the decoding device shown in Fig. 2A can equally well operate on the codes shown in Fig. 3, or on such codes with the green modified to comprise, send three, then a blank, so that the green code would have a pattern similar to the other codes shown and be cyclic in character. In Fig. 2A the energizing circuit for Y/G rep. runs through contact finger $39^1$ and back point of $R^6$, instead, as in Fig. 2, directly from contact finger 41 and front point of $R^4$. In this manner, energization of Y/G rep. through contact finger 35 and back point of $R^1$, under such cyclic form of G code, is prevented. In the form shown in Fig. 2, it would be impossible, with such cyclic G code, to go from Y/G to G. With such a pattern or cyclic form of G code, during the blank $R^2$ will drop and cause the decoding relays to clear out, as described for Y code, for example.

Figure 6:
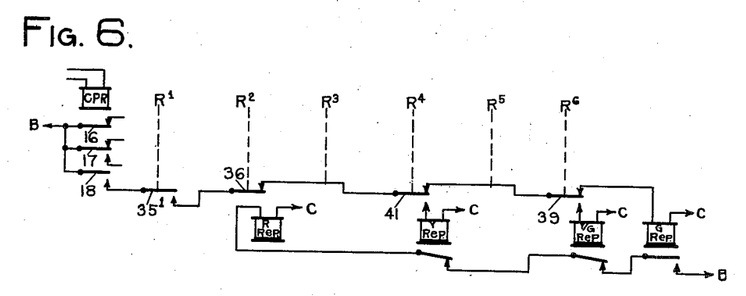
Fig. 6 is a fragmentary view showing a modified form of decoding means, slightly different from the form shown in Fig. 2.

The modified form of apparatus shown in Fig. 6 differs only slightly from that shown in Fig. 2, so that Fig. 6 has been restricted to show only the points of difference. As described just above, the form of decoding apparatus shown in Fig. 2A will operate equally well on a frequency type of green code such as shown in Fig. 3, or on a green code having a pattern similar to that of the other codes, such, for example, as is shown for the green code in Fig. 7. To the contrary, however, the form of apparatus shown in Fig. 6 will operate only on a code having a pattern, such, for instance, as shown for the green code in Fig. 7, that is, there must be an extended blank, or "off" period, between the sending periods. It is deemed desirable, under certain conditions, to have apparatus including a decoding means which will not operate on a continuous or frequency code, such as the green code of Fig. 3, since it is barely possible, although not at all probable, that such a frequency code might occur on the track rails unintentionally, or the effect of such a frequency code be produced for example by some vibrating part on the locomotive. It is obviously much less likely to have a code such as the green code of Fig. 3, to be accidentally put on the rails, than it is to have a steady application of current such as is used in the uncoded continuous type of train control. On the other hand, it is still less likely, and in fact scarcely conceivable, that a pattern type of code, such as the clear code shown in Fig. 7, should unintentionally or accidentally occur on the track rails, or the effect of such a cyclic pattern code be accidentally produced and maintained by mechanical vibration or the like. It is thus believed that it may possibly be desirable, in some cases, to use a form of decoding apparatus such as shown in Fig. 6 to thereby take the utmost possible precaution against any false indication.

On comparing the forms of invention shown in Figs. 2 and 6, it will be seen that the difference resides in having the executing circuits for various of the repeater relays somewhat differently arranged in the two cases. In Fig. 2, the executing circuit, that is, the energizing circuit set up by the relays $R^1$–$R^6$, for relay G rep. includes contact finger 35 and front contact of relay $R^1$, whereas the executing circuits for the other repeater relays except R rep., that is, for Y rep. and Y/G rep. include this same contact finger 35 and a back contact of relay $R^1$.

In Fig. 6, however, it will be seen that the executing circuits for all of the repeater relays except R rep. include the contact finger $35^1$ and a back contact of relay $R^1$. Therefore in order to energize any of the repeater relays, except the R rep. it is required that relay $R^1$ be allowed an opportunity to release, and if the code being received does not include the proper blank following the proper number of impulses, then no energy will be passed from the decoding device to the repeater relays. This in turn will cause any repeaters that may have been energized, by energy from the decoder to release, and thus establish the pick up circuit for the R rep. through the circuit including the contact fingers and back contacts of the three repeater relays G rep., Y/G rep. and Y rep. Hence it is to be seen that the apparatus rearranged as shown in Fig. 6 acts to display a red indication in the event that the code performance fails to include the proper blanks as well as proper impulses, and thus guards against a false clear indication as a possible result of an unauthorized frequency or rate type of code.

Figure 7:
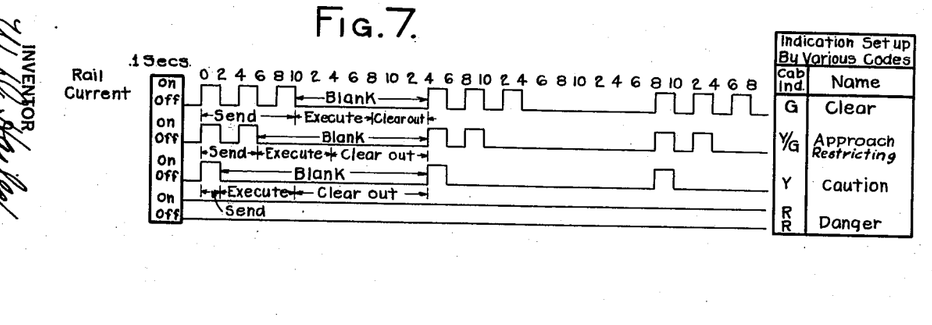
Fig. 7 is a diagrammatic showing of codes particularly adapted to use with the modified form of apparatus shown in Fig. 6.

Referring to Fig. 2A, it is here necessary also for execution for Y and Y/G, that is for putting energy onto either of these repeater relays, to have a blank included in the code of sufficient duration to permit relay $R^1$ to release its contact finger 35 whereby to complete the particular executing circuit. In the case of the green repeater G rep., however, no such release of relay $R^1$ is necessary, since the green repeater relay has an executing circuit including a front point of relay $R^1$. Thus the form shown in Fig. 2A can operate equally well on a green code of the frequency type, such as shown in Fig. 3, and one of a cycle type, as shown in Fig. 7, whereas the form of decoder shown in Fig. 6 cannot operate on a frequency type of code such as the green code shown in Fig. 3; since relay G rep. of Fig. 6 is energized through $R^1$ down, and hence a blank long enough to drop $R^1$ is necessary to pick up this G rep. but can operate only on a cyclic type of code.

In the form of invention shown in Fig. 6, the various decoding relays $R^1$ to $R^6$ pick up in succession and are then cleared out, for each complete cycle of the green code, in the same manner as occurs for the other codes, whereas in the form of Fig. 2A, these relays $R^1$ to $R^6$, when operating under the frequency green code such as shown in Fig. 3, stay up after once being picked up and are not periodically cleared out. Thus, as between the two forms of invention, that of Fig. 6 gives somewhat greater assurance against a false clear indication, at the expense of additional movement of the armatures of the decoding relays, while that of Fig. 2A has possibly a slightly greater danger of a false clear, with the advantage of decreasing the number of movements of the armatures of the decoding relays. Of course, both forms of the invention are designed on the closed circuit principle and are inherently much more proof against false indications than any uncoded continuous system can be.

Figure 8:
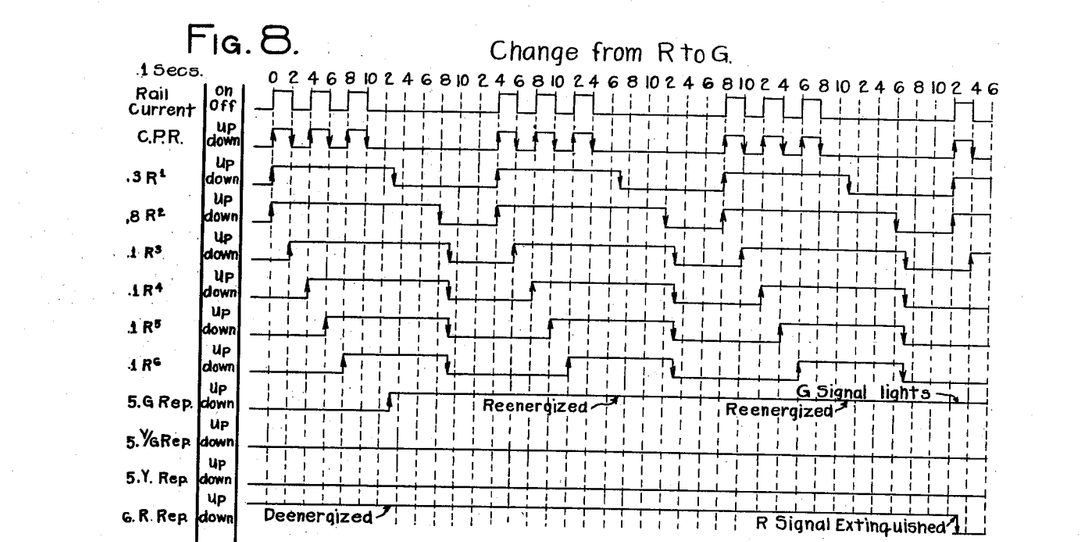
Fig. 8 is a diagrammatic time study of the operation of the apparatus of the form of invention shown in Fig. 6, upon a change in conditions from danger to clear.

The time study, illustrated in a diagrammatic manner in Fig. 8, shows the operation of the various relays of the form of invention shown in Fig. 6, upon a change from danger to clear, and can be readily followed in the same manner as described above with regard to the time studies of Figs. 4 and 5 which relate to the form of invention shown in Fig. 2.

Figure 9:
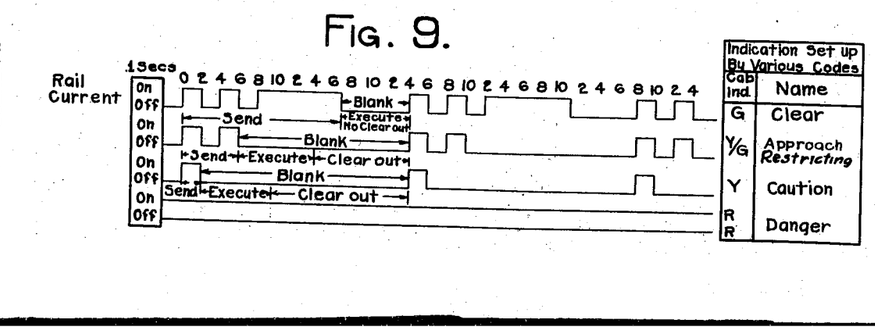
Fig. 9 is a diagrammatic showing of another form of codes particularly adapted for use with the modified form of apparatus shown in Fig. 6.
Figure 10:
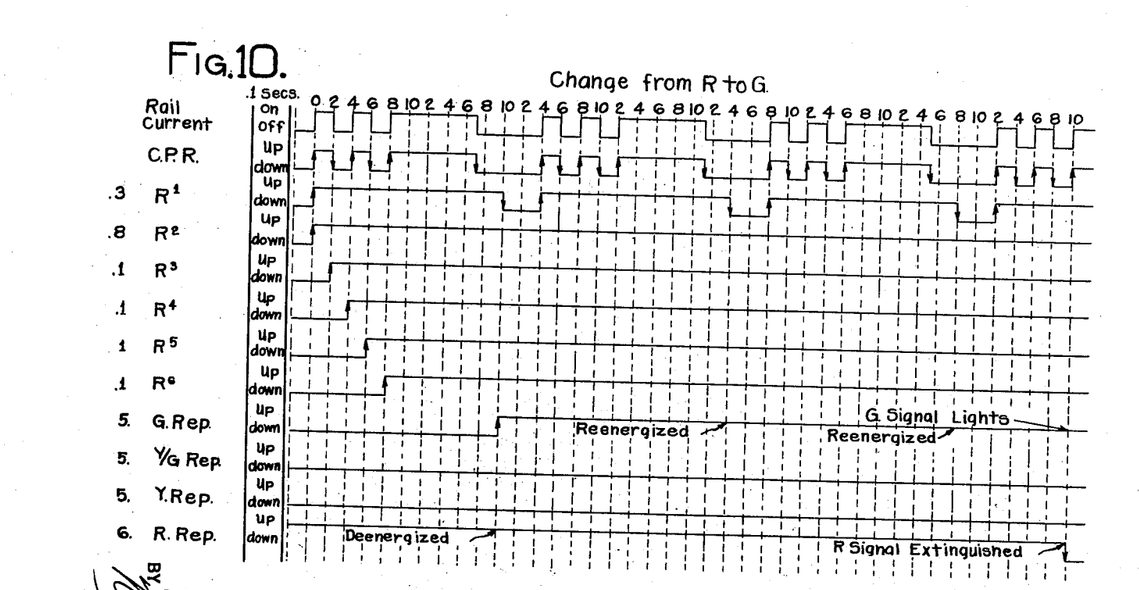
Fig. 10 is a diagrammatic time study of the operation of the apparatus of the form of invention shown in Fig. 6, upon a change in conditions from danger to clear of the codes shown in Fig. 9.

Referring now to Figs. 9 and 10, there is shown a modified set of codes for use with either one of the two forms of car-carried apparatus shown respectively in Figs. 2A and 6, and a diagrammatic time study of the operation of the apparatus of Fig. 6 with these codes, upon a change in condition from danger to clear.

Considering the above description, it will be recalled that with the use of a clear code of a frequency type, such as shown in Fig. 3, the undesirable wear that might result due to repeated clear-out of the various relays $R^1$ to $R^6$, while running under clear conditions, was avoided. On the other hand, it was deemed somewhat more desirable to use a clear code of the cyclic pattern, or periodically recurrent, type, such as shown in Fig. 7, whereby to more fully safeguard against a possible false clear. With this end in view, the form of car-carried apparatus shown in Fig. 6 was invented, such form not being operable in connection with the frequency type of code, as shown for the green code, in Fig. 3.

The modified type of code shown in Fig. 9, for green, or clear condition, can be used with either of the forms of car-carried apparatus of Figs. 2 and 6, but is preferably used in connection with the form shown in Fig. 6, since this form requires a pattern type of code to operate it. As will be seen from the showing of the green code in Fig. 9, this code comprises a sending period, followed by a blank which serves as an executing period, the sending period including three spaced impulses, followed by a blank during which relay $R^1$ releases to thereby complete the executing circuit for the green repeater relay G rep. so as to put energy on such relay and cause it to pick up. By suitably prolonging the third sending impulse for each cycle of green code, the blank is shortened up to extend over a period of time less than the release time for the clear-out relay $R^2$, whereby there is no clearing out of the decoding relays $R^2$ to $R^6$. A careful consideration of the time study of Fig. 10 will clearly show just how the various relays operate, the net result being that the coding primary relay CPR picks up and releases successively, to follow the "on" and "off" periods of the coded control current, while relay $R^1$ picks up and releases once for each cycle of code, but relays $R^2$ to $R^6$, when once picked up, stay up from one cycle of code to the next, and do not again release to cause a clear-out until a more restrictive code, having a longer blank, is encountered.

It will be seen that with the arrangement of codes shown in Fig. 9, when used in connection with car-carried apparatus as shown in Fig. 6, there is obtained the advantage of having a car-carried apparatus which will respond only to a cyclic or pattern type of code, and not to a frequency type, and which, at the same time, comprises relays which are not cleared out during each cycle of the clear code, thus combining the desirable features of the two forms of invention shown respectively in Figs. 2-5 and Figs. 6-8.

Figure 11:
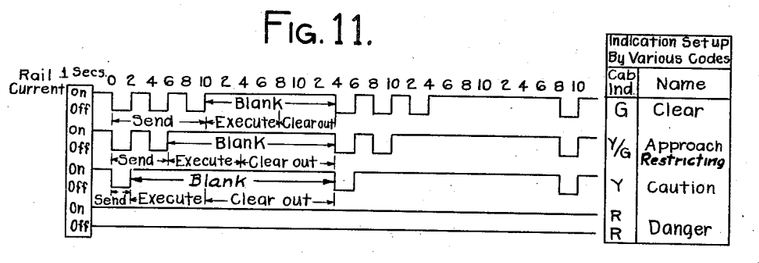
Fig. 11 is a diagrammatic showing of another modified form of codes.
Figure 12:
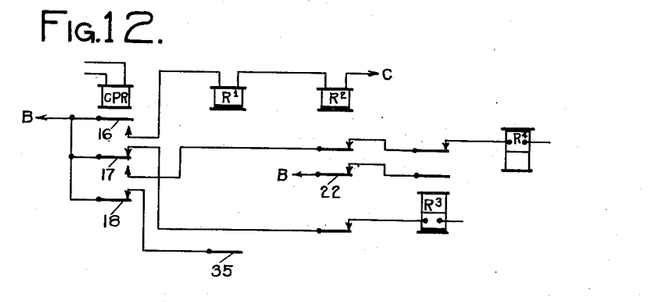
Fig. 12 is a fragmentary view showing a further modified form of decoding means, differing slightly from the forms shown in Figs. 2, 2A, and 6, for operation with the codes of Fig. 11.

Referring now to Figs. 11 and 12, there is shown a modified form of code, and of car-carried apparatus arranged to operate on such code.

The form of code in Fig. 11, is exactly the inverse, or reverse, of that of Fig. 7 and is produced by turning the code of Fig. 7 upside down, so that a current "on", becomes a current "off", and an "off" an "on" in the new form.

Likewise, the decoding apparatus of Fig. 12 is the same as shown in Fig. 6. However, the circuits connected to the front and back points of CPR of Fig. 6 which cooperate with the relay fingers 16, 17, and 18 have been interchanged, or reversed. For example, finger 16, in Fig. 6, energizes $R^1$ and $R^2$ when up, while this finger 16, in Fig. 12, energizes $R^1$ and $R^2$ when down, and the same is true for fingers 17 and 18 as is clear from the figures of drawings.

Thus, from the above, it is clear that any selected code can be reversed as to on and off periods of current, and can then be used with car-carried apparatus if the circuits to the front and back contacts of the relay CPR are likewise reversed.

The advantage of the form of invention of Figs. 11 and 12, is clear from the following. Suppose, instead of having direct current track circuits as shown in Fig. 1, the track circuits are normally fed continuously with the train control current (in the present case alternating current of 100 cycles, and the track relays are such as to be actuable by the 100 cycle current). After a train has vacated a block, the wayside signal will be held at stop and the coding motor will continue to run until the track relay picks up. Thus, it is desirable that the code current have a sufficiently long "on" period in each cycle, to pick up the track relay. Possibly the track relay, under some conditions, might conceivably fail to pick up, with the "Y" code of Fig. 7, for example, but with the "Y" code, of Fig. 11, there is an extended "on" period of current to insure the track relay pick-up. By reversing the code, there is obtained for each code, a longer "on", than "off" period, i. e. just the reverse of what prevails in Fig. 7.

Summary

In order to facilitate a clear understanding of the invention, it may be well to summarize certain of the foregoing features.

There have been shown, and described, four forms of car-carried apparatus, and four sets of codes. The car-carried apparatus of Figs. 2 and 2A execute for the green code through a front point of decoding relay $R^1$, and for the other codes except danger, through a back point of this same decoding relay; whereas in the form shown in Fig. 6, the execution for all of the codes, except danger, and including the green code, is performed through a back point of the decoding relay $R^1$, and hence, for execution of the green, a blank of sufficient duration to drop $R^1$, is required.

With regard to the different sets of codes shown, all of the differences in the first three forms reside in the particular code chosen for clear, or G, the form for G shown in Fig. 3 being of the frequency type, that is, it is non-cyclic in character, or in other words does not have a particular pattern form, while the forms shown in Figs. 7 and 9 are of the cyclic, or periodically recurring, type, having a characteristic pattern. The code of Fig. 11 is an exact invert or reversal (i. e. upside down) of the Fig. 7 code, and merely illustrates that any code suitable for car-carried apparatus as in Figs. 2, 2A, and 6, can be inverted and is then usable with the modified form of car-carried apparatus shown in Fig. 12, thus to obtain a long enough "on" period of current in each cycle to pick up the track relay upon the block being vacated.

It will be clear that the car-carried apparatus of Fig. 2A will operate on all of the first three sets of codes shown and described, that is, on either the frequency, or the cyclic, type of code. When operating on the frequency type of code for clear conditions, the executing circuit for relay G rep. is completed on each release of relay CPR after relays $R^1$–$R^6$ have been picked up, since the executing circuit includes contact finger 18 and back point of relay CPR, and a front point of each of the relays $R^1$, $R^2$, $R^4$, and $R^6$.

When this form, (Fig. 2A) of car-carried apparatus is operating in connection with the cyclic form of code for clear conditions, the executing circuit for relay G rep. is the same as just traced above and is completed upon release of the coding primary relay finger 18 at the end of a sending period, and remains intact until relay $R^1$ releases, (in this case .3 of a second) after the sending period has stopped.

With regard to the form of car-carried apparatus shown in Fig. 6, however, no executing circuit can be completed for any of the indications, except danger, without the release of relay $R^1$ after the end of a sending period, and hence this form will operate only with a cyclic type of code having a blank or non-sending period of long enough duration to allow release of relay $R^1$, this resulting in pick-up of the particular repeater relay which has been chosen by the decoding relays in accordance with the code being received.

It thus appears that for maximum safety, and with practically a minimum of movement of the various parts, there should be used the car-carried apparatus as shown in Fig. 6, in connection with a set of codes such as shown in Fig. 9, or, in the case of track circuits energized by current of the same frequency as the train control current, with a set of codes as shown in Fig. 9, after being inverted, or turned upside down, as illustrated in Fig. 11, which is the reverse of the codes of Fig. 7.

The above description of this invention has been given primarily with a view to simplifying an understanding of the invention, and its operation, and the various parts have been shown and described with this end in view. No effort has been made to show the actual construction and arrangement of parts as they would preferably exist in practice. It is obvious that if a more or less number of controls be desired, these can be provided for by adding, or taking away, certain relays, and that the system has been shown in connection with four indications merely for the purpose of illustration.

Furthermore, while it is contemplated to use alternating current on the track for train control purposes, it might be desirable, under certain conditions, to use direct current and to shock excite the receiving circuits sufficiently to cause a momentary pick-up the coding relay CPR once for each application and once for each removal of direct current, or vise versa. Furthermore, it might prove more desirable in the use of direct current to have each "on" period of current comprise not a steady flow of direct current but to have the direct current interrupted several times, so that each "on" period of current would comprise a train of separate direct current impulses thus causing a series of shocks to excite the receiving circuits so as to cause oscillations of sufficient amplitude to pick up and hold up relay CPR for the duration of the so-called "on" period of track current.

The above rather specific description of one form of the invention is given solely by way of example, and is not intended, in any manner whatsoever, in a limiting sense. Obviously the invention can assume many different physical forms, and is susceptible of numerous modifications, and all such forms and modifications are intended to be included by this application, as come within the scope of the appended claims.

Having described my invention, I now claim:—

1. In a continuous train control system, means controlled in accordance with traffic conditions for putting cyclic type coded alternating current on the track rails of an occupied block only, and car-carried decoding means responsive to said coded current to set up distinctive energizing circuits, each cycle of said cylic code comprising a sending period including separate current impulses followed by a non-sending period of substantially greater length than the portions separating said separate current impulses.

2. In a continuous train control system, means controlled in accordance with traffic conditions for putting cyclic type coded alternating current on the track rails of an occupied block, car-carried decoding means responsive to the coded current to set up distinctive energizing circuits, each cycle of said cyclic code comprising a sending period followed by a non-sending period, said decoding means assuming a distinctive condition during each sending period, and having an executing period and a clear-out period during each non-sending period, said energizing circuits being completed during said executing period and de-energized during the clear-out period.

3. In a continuous train control system, means controlled in accordance with traffic conditions for putting cyclic type coded alternating current on the track rails of an occupied block only, car-carried decoding means responsive to the coded current to set up distinctive energizing circuits, each cycle of said cyclic code comprising a sending period followed by a non-sending period, said decoding means assuming a distinctive condition during each sending period and having an executing period and a clear-out period during each non-sending period, said energizing circuits being completed during said executing period and de-energized during the clear-out period, said decoding means being restored from said distinctive condition to its normal condition during the clear-out period.

4. In a continuous train control system, means controlled in accordance with traffic conditions for putting cyclic type coded alternating current on the track rails of an occupied block only, car-carried decoding means responsive only to the cyclic type of coded current to set up distinctive energizing circuits, each cycle of said cyclic code comprising a sending period including a plurality of on and off current periods followed by a relatively extended non-sending period.

5. In a continuous train control system, means controlled in accordance with traffic conditions for putting cyclic type coded alternating current on the track rails of an occupied block only, car-carried decoding means responsive to the coded current to set up distinctive energizing circuits, each cycle of said cyclic code comprising a sending period followed by a non-sending period, said decoding means assuming a distinctive condition during each sending period only if the non-sending period exceeds a predetermined duration, and having an executing period and a clear-out period during each non-sending period, said energizing circuits being completed during said executing period and de-energized during said clear-out period.

6. In a train control system, traffic controlled means to place coded control current on the track rails, car-carried decoding means responsive to the coded rail current to assume distinctive conditions, a plurality of cab signals, a slow release retaining relay corresponding to each cab signal and arranged to be selectively picked up in accordance with the particular distinctive condition of the decoding means, and signal circuits for the cab signals completed for a particular signal when the corresponding retaining relay is picked up and provided none of the other retaining relays are picked up.

7. In a train control system, traffic controlled means to place coded control current on the track rails, car-carried decoding means responsive to the coded rail current to assume distinctive conditions, a plurality of cab signals, a slow release retaining relay corresponding to each cab signal and arranged to be selectively picked up in accordance with the particular distinctive condition of the decoding means, signal circuits for the cab signals completed for a particular signal when the corresponding retaining relay is picked up provided none of the other retaining relays are picked up, the retaining relay for the most restrictive signal having a release time greater than that of the other such relays and having an energizing circuit passing through a back point of each of the other such relays.

8. In a train control system, a plurality of distinctive cab signals, a stick relay corresponding to each signal, a slow release relay corresponding to each signal, traffic controlled means for putting control current on the track rails, car-carried means responsive to said control current to selectively energize one of said slow release relays, and two energizing circuits for each said signal, one of which includes a front point of the corresponding slow release relay, a back point of each less restrictive slow release relay, and a back point of each of the stick relays, and the other of which includes a front point of the corresponding slow release relay, a front point of the corresponding stick relay, and a back point of each more restrictive stick relays.

9. In a train control system, a plurality of distinctive cab signals, a stick relay corresponding to each signal, a slow release relay corresponding to each signal, traffic controlled means for putting control current on the track rails, car-carried means responsive to said control current to selectively energize one of said slow release relays, and two energizing circuits for each said signal, one of which includes a front point of the corresponding slow release relay, a back point of each less restrictive slow release relay, and a back point of each of the stick relays, and the other of which includes a front point of the corresponding slow release relay, a front point of the corresponding stick relay, and a back point of each more restrictive stick relays, the stick circuit for each said stick relay passing through a front point of the correponding slow release relay.

10. In a continuous train control system, means controlled in accordance with traffic conditions, for putting cyclic type coded alternating current on the track rails, of an occupied block only, car-carried decoding means responsive to the coded current to set up distinctive energizing circuits, said cyclic code having each cycle comprise, a sending period of spaced current impulses, during which the decoding means is operated, followed by a non-sending period to which the decoding means is immune to operation and during which control current is steadily applied to the rails, whereby to insure pick-up of the track relay of a block upon such block being vacated.

11. In a continuous train control system, means controlled in accordance with traffic conditions, for putting cyclic type coded alternating current on the track rails of an occupied block only, car-carried decoding means responsive to the coded current to set up distinctive energizing circuits, said cyclic code having each cycle comprise a sending period followed by a non-sending period, said decoding means assuming a distinctive condition during each sending period, and having an executing period and a clear-out period during each non-sending period, said energizing circuits being completed during said executing period and de-energized during the clear-out period, said non-sending period comprising control current steady on, whereby to insure pick-up of the track relay of a block upon such block being vacated.

12. An automatic train control system comprising in combination, a track divided into insulated blocks, a track relay and a source of current connected across the rails at the entrance and exit ends respectively of each block, normally inactive means for intermittently connecting a source of energy across the track rails of a block when a vehicle enters that block under clear traffic conditions to produce a periodic code of impulses in the rails, said code consisting of a long impulse and a plurality of short impulses, and vehicle controlling means responsive to said code, said means comprising a relay on the vehicle responsive to the impulses, a slow acting relay the circuit of which is controlled by said vehicle relay, a series of quick acting relays consecutively energized as said vehicle relay is energized and de-energized, stick circuits respectively for said quick acting relays, all of said stick circuits being controlled by said slow acting relay, and a vehicle controlling circuit controlled jointly by said quick acting relays and said slow acting relay.

13. An automatic train control system, comprising in combination with means to produce in the track rails a re-current code of impulses, a vehicle on the track having a relay responsive to the impulses, a slow acting relay the circuit of which is controlled by said vehicle relay, and a plurality of quick acting relays consecutively energized as said vehicle relay is energized and de-energized, stick circuits respectively for said quick acting relays, all of said stick circuits being controlled by said slow acting relay, and a vehicle controlling circuit including in series front contacts of said quick acting relays.

14. In a coded continuous train control system, in combination with a train carried receiving and decoding means, trackway means for applying code to the rails, including a track relay for cutting coded current onto the rails, the code comprising recurrent cycles of spaced plural current impulses with the cycles spaced by relatively extended current-on periods, whereby to better assure picking up of the track relay immediately upon its block becoming vacated.

15. In a coded continuous train control system, in combination with a train carried receiving and decoding means, trackway means for applying code to the rails, including a track relay for cutting coded current onto the rails when shunted, the code comprising recurrent cycles of relatively short spaced plural current off periods with the cycles spaced by relatively extended current-on periods, whereby to assure picking up of the track relay immediately upon its block becoming vacated.

16. A selector of the counting relay type comprising a control relay, a plurality of counting relays arranged in order, a pick-up circuit for each odd numbered counting relay including a front contact of the next preceding relay and a contact of said control relay closed in one position, a pick-up circuit for each even numbered counting relay including a front contact of the next preceding counting relay and a contact of said control relay closed in another position, and a stick circuit for each counting relay including a contact dependent upon energization of said control relay.

17. A selector of the counting relay type comprising a control relay, a plurality of counting relays arranged in order, a pick-up circuit for each odd numbered counting relay including a front contact of the next preceding relay and a contact of said control relay closed in one position, a pick-up circuit for each even numbered counting relay including a front contact of the next preceding counting relay and a contact of said control relay closed in another position, and a stick circuit for each counting relay including a contact controlled by said control relay.

18. In a selective system, the combination with a circuit, of a primary relay in said circuit and a series of counting relays arranged in order, and each having two windings; a pick-up circuit for each odd numbered relay each except the first including one winding of the relay, a front contact of the next preceding relay, and a contact of the primary relay; a slow release relay controlled by said primary relay; and a stick circuit for each counting relay including the other winding and a front contact of the relay, and a contact of the slow release relay.

19. In a selective system for controlling the movement of trains; the combination with a circuit, of a primary relay in said circuit and a series of counting relays arranged in order; a pick-up circuit for each odd numbered counting relay each except the first including the winding of such relay, a front contact of the next preceding relay, and a contact of the primary relay; a slow release relay controlled by said primary relay; a stick circuit for each counting relay including a front contact of such relay, and a contact of the slow release relay; and a signal for governing the movement of trains controlled by said counting relays.

20. In a selective system for controlling the movement of trains; the combination with a circuit, of a primary relay in said circuit and a series of counting relays arranged in order; a pick-up circuit for each odd numbered counting relay each except the first including the winding of such relay, a front contact of the next preceding relay, and a contact of the primary relay closed when it assumes one position; a pick-up circuit for each even numbered counting relay each including the winding of such relay, a front contact of the next preceding relay, and a contact of said primary relay closed when it assumes another position; a stick circuit for each counting relay including a front contact of such relay; and a signal for governing the movement of trains controlled by said counting relays.

21. Railway traffic controlling apparatus comprising a signal carried by a train, a relay $R^1$ for controlling said signal, a contact device for controlling the operation of relay $R^1$, a plurality of counting relays adapted to be energized in a predetermined sequence for controlling the operation of said signal jointly with the relay $R^1$, energizing circuits for said counting relays controlled by said contact device, energizing circuits for said counting relays controlled by relay $R^1$, and stick circuits for said counting relays also controlled by relay $R^1$.

22. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal jointly with relay $R^1$, energizing circuits for certain of said counting relays controlled by relay $R^1$, and stick circuits for said counting relays controlled by relay $R^1$.

23. Railway traffic controlling apparatus comprising a signal carried by a train, a relay $R^1$ for controlling the operation of said signal, a contact device for controlling the operation of relay $R^1$, a plurality of counting relays adapted to be energized in a predetermined sequence for controlling the operation of said signal jointly with relay $R^1$, energizing circuits for certain of said counting relays controlled by relay $R^1$, said energizing circuits including the front contacts and the windings of certain others of said counting relays.

24. Railway traffic controlling apparatus comprising a signal carried by a train, a relay for controlling said signal, a contact device for controlling the operation of said relay, a plurality of counting relays adapted to be energized in a predetermined sequence for controlling the operation of said signal jointly with said relay, energizing circuits for said counting relays controlled by said relay, and stick circuits for said counting relays also controlled by said relay.

25. Railway traffic controlling apparatus comprising a signal carried by a train, a relay for controlling the operation of said signal, a contact device for controlling the operation of said relay, a plurality of counting relays adapted to be energized in a predetermined sequence for controlling the operation of said signal jointly with said relay, energizing circuits for said counting relays controlled by said relay, and stick circuits for said counting relays controlled by said relay.

26. Railway traffic controlling apparatus comprising a signal carried by a train, a relay for controlling the operation of said signal, a contact device for controlling the operation of said relay, a plurality of counting relays adapted to be energized in a predetermined sequence for controlling the operation of said signal jointly with said relay, energizing circuits for said counting relays controlled by said relay, said energizing circuits including the front contacts, and the windings, of certain others of said counting relays.

WILLIAM D. HAILES.